Sept. 2, 1952        R. E. SMITH        2,608,942
TOP INSULATOR FOR MOTOR VEHICLE BODIES
Filed July 9, 1949                             2 SHEETS—SHEET 1
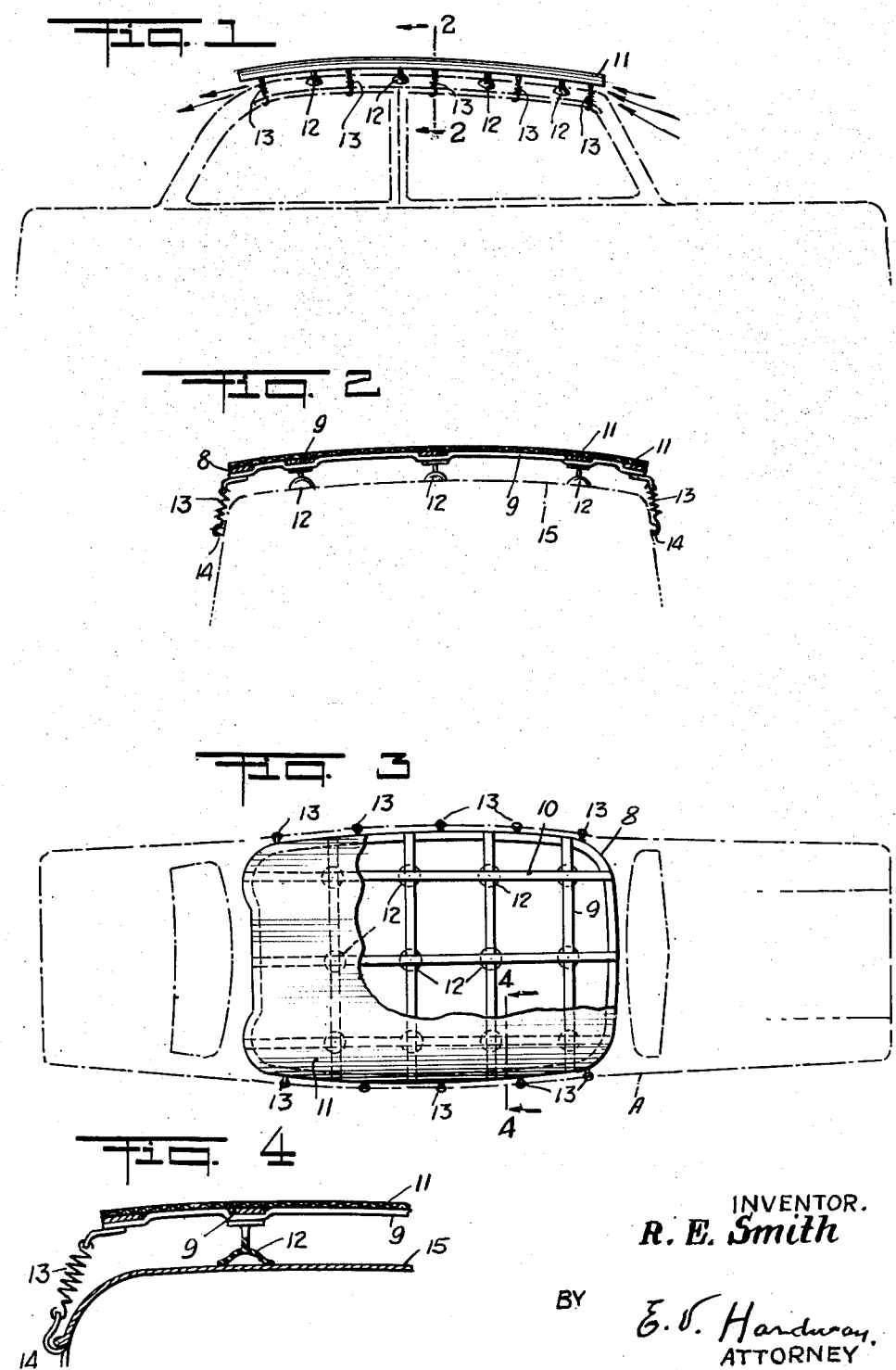
INVENTOR.
R. E. Smith
BY E. V. Hardway,
ATTORNEY Sept. 2, 1952 R. E. SMITH 2,608,942
TOP INSULATOR FOR MOTOR VEHICLE BODIES
Filed July 9, 1949 2 SHEETS—SHEET 2
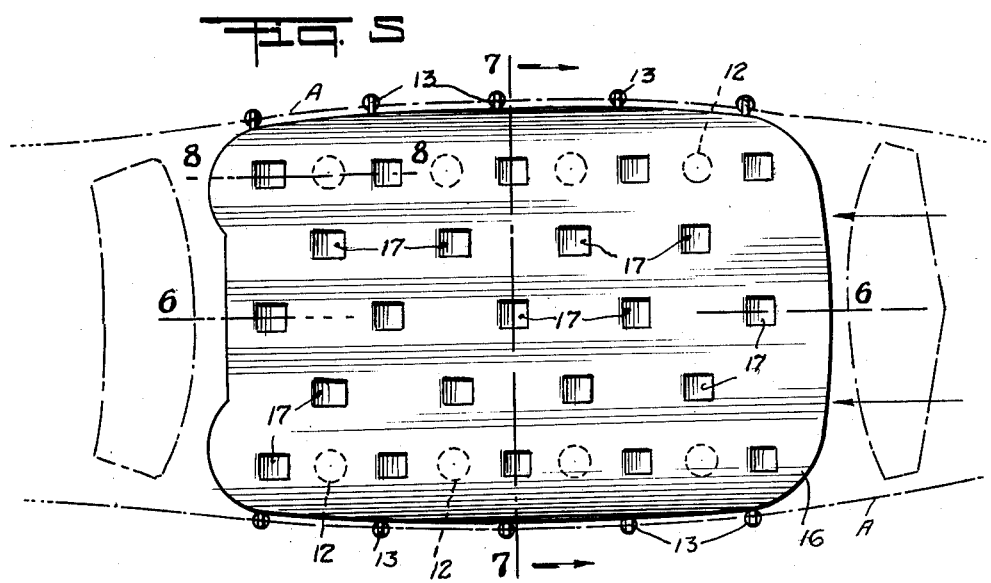
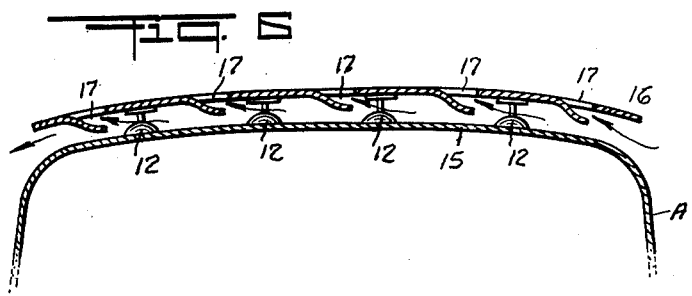
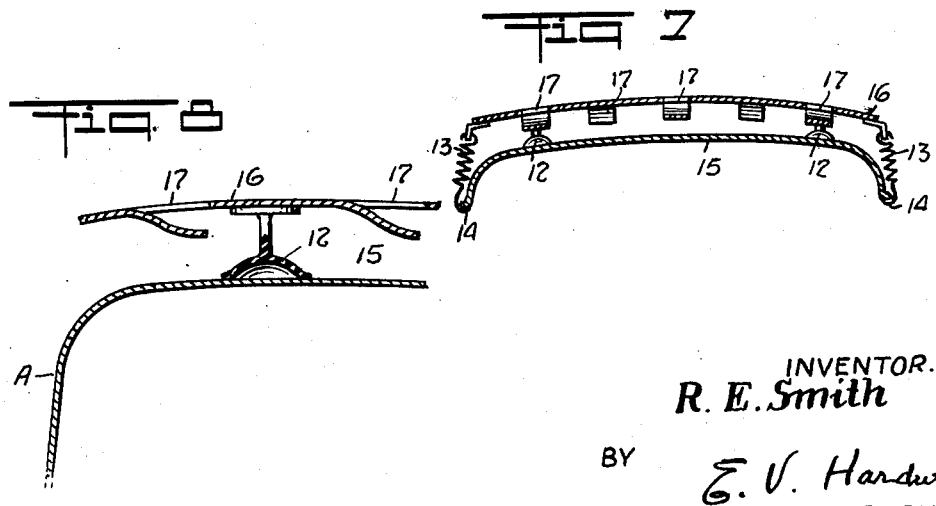
INVENTOR.
R. E. Smith
BY
E. V. Hardway
ATTORNEY Patented Sept. 2, 1952

2,608,942

UNITED STATES PATENT OFFICE 2,608,942

TOP INSULATOR FOR MOTOR VEHICLE BODIES

Robert E. Smith, Houston, Tex.

Application July 9, 1949, Serial No. 103,778

3 Claims. (Cl. 108—3)

This invention relates to a top insulator for motor vehicle bodies.

The main object of the invention is to provide insulating means that will protect the top of the vehicle body from the direct rays of the sun while the vehicle is parked or in motion, and which will augment the air current along the top of the body while the vehicle is in use, thereby reducing the temperature of the air within the body. The top insulator may be continuous or it may be provided with outlet openings distributed throughout the area thereof.

It is another object of the invention to provide insulating means of the character described which may be readily fastened permanently to the vehicle body or may be readily detached therefrom.

Other objects and advantages will be apparent from the following specification which is illustrated by the accompanying drawings wherein:

Figure 1 is a side elevation of the insulator shown applied to the top of a motor vehicle.

Figure 2 is a cross-sectional view taken on the line 2—2 of the Figure 1.

Figure 3 is a plan view showing the cover partly broken away.

Figure 4 is an enlarged fragmentary sectional view taken on the line 4—4 of Figure 3, Figure 5 is a top plan view of another embodiment of the invention.

Figure 6 is a longitudinal sectional view taken on the line 6—6 of Figure 5.

Figure 7 is a cross-sectional view taken on the line 7—7 of Figure 5, and,

Figure 8 is an enlarged, fragmentary cross-sectional view of the embodiment illustrated in Figure 5.

Referring now more particularly to the drawings, the motor vehicle body, as a whole, is designated by the letter A.

In the embodiment disclosed in Figures 1 through 4 inclusive, there is a frame 8 which is substantially the same size, and conforms in shape to, the top of the vehicle body. This frame may have the cross bars 9 spaced apart longitudinally therealong and the longitudinal bars 10 spaced apart, said bars being suitably spaced apart with the ends secured to the frame 8.

A skeleton support is thus provided which may be of metal or other suitable material such as wood or plastic. This skeleton structure may be covered by a suitable cover 11 which, in the present illustration, is water proof fabric.

The skeleton framework structure is supported above the top 15 of the body by means of vacuum cups 12 formed of rubber or other suitable material which have upstanding shanks that are secured to the bars 9 and 10, preferably at the intersection, as clearly shown in Figure 3. These vacuum cups will hold the insulator against shifting on the permanent top of the vehicle body; also there are the elastic tie members 13 which are fastened to each side margin of the frame and whose outer ends have hooks 14 engageable underneath the water troughs on the sides of the vehicle body above the doors as shown in Figure 4.

It is apparent that a current will be set up between the permanent top of the vehicle body and the insulator above described which will prevent the top of the vehicle from becoming so intensely hot when subjected to the sun for long periods of time, thus keeping the temperature within the vehicle reasonably low, and this temperature will be lowered while the vehicle is in motion, inasmuch as the current between the top and insulator will be augmented.

As illustrated in Figures 5 to 8 inclusive the insulator body consists of a plate 16 formed of sheet metal or other sheet metal. It is supported spaced above the top 15 by means of the vacuum cups 12 as illustrated in the other figures.

Its margins are secured to the vehicle body by the elastic time members 13 in a manner hereinabove explained.

However, in this form of the invention the plate 16 may be provided with perforations as 17 approximately throughout its area so as to provide for a freer circulation of air. In forming these perforations, the material is displaced downwardly, excepting at the rear margin of each perforation, thus providing downwardly and forwardly directed tongues which form deflectors to facilitate the air flow.

As hereinabove indicated, the insulator may be made up of various materials such as metal or plastic material, or other suitable selected material, or of thin slats or a combination of the above mentioned materials, but the skeleton framework with the fabric covering as shown in Figure 1, or the continuous metal sheet or plate as shown in Figure 2 are now considered to be the preferred forms of the invention; however, the principle of the invention is not confined to any specific type of structure except as defined by the appended claims.

What I claim is:

1. A top insulator for motor vehicle bodies comprising, upstanding supports on the top of the body, a cover of sheet material on the supports spaced above said top and substantially co-extensive therewith, said cover having outlet openings distributed approximately throughout the area thereof, and a forwardly directed tongue beneath each of the openings formed by downward displacement of the material of the cover.

2. A top insulator for motor vehicle bodies comprising, upstanding supports on the top of the body, a sheet-like cover on the supports spaced above said top and substantially co-extensive therewith, said cover having outlet openings arranged in staggered relation and distributed approximately throughout the area thereof, and forwardly directed deflector means beneath each of the openings for deflecting a current of air upwardly through the openings.

3. A top insulator for motor vehicle bodies comprising upstanding supports on the top of the body, a cover of sheet material on the supports spaced above said top and substantially co-extensive therewith, said cover having spaced rows of outlet openings distributed approximately throughout the area thereof, and forwardly directed deflector means beneath each of the openings formed by downward displacement of the material of the cover, said deflector means terminating above said top.

ROBERT E. SMITH.

REFERENCES CITED

The following references are of record in the file of this patent:

UNITED STATES PATENTS

| Number | Name | Date |
|---|---|---|
| 1,616,126 | Jacobson | Feb. 1, 1927 |
| 2,121,264 | Rubottom | June 21, 1938 |
| 2,496,085 | Engelheart | Jan. 31, 1950 |